Aug. 19, 1952     T. J. LEHANE ET AL     2,607,532
TEMPERATURE CONTROL FOR AIR BLENDING HEATING SYSTEMS
Filed June 17, 1948
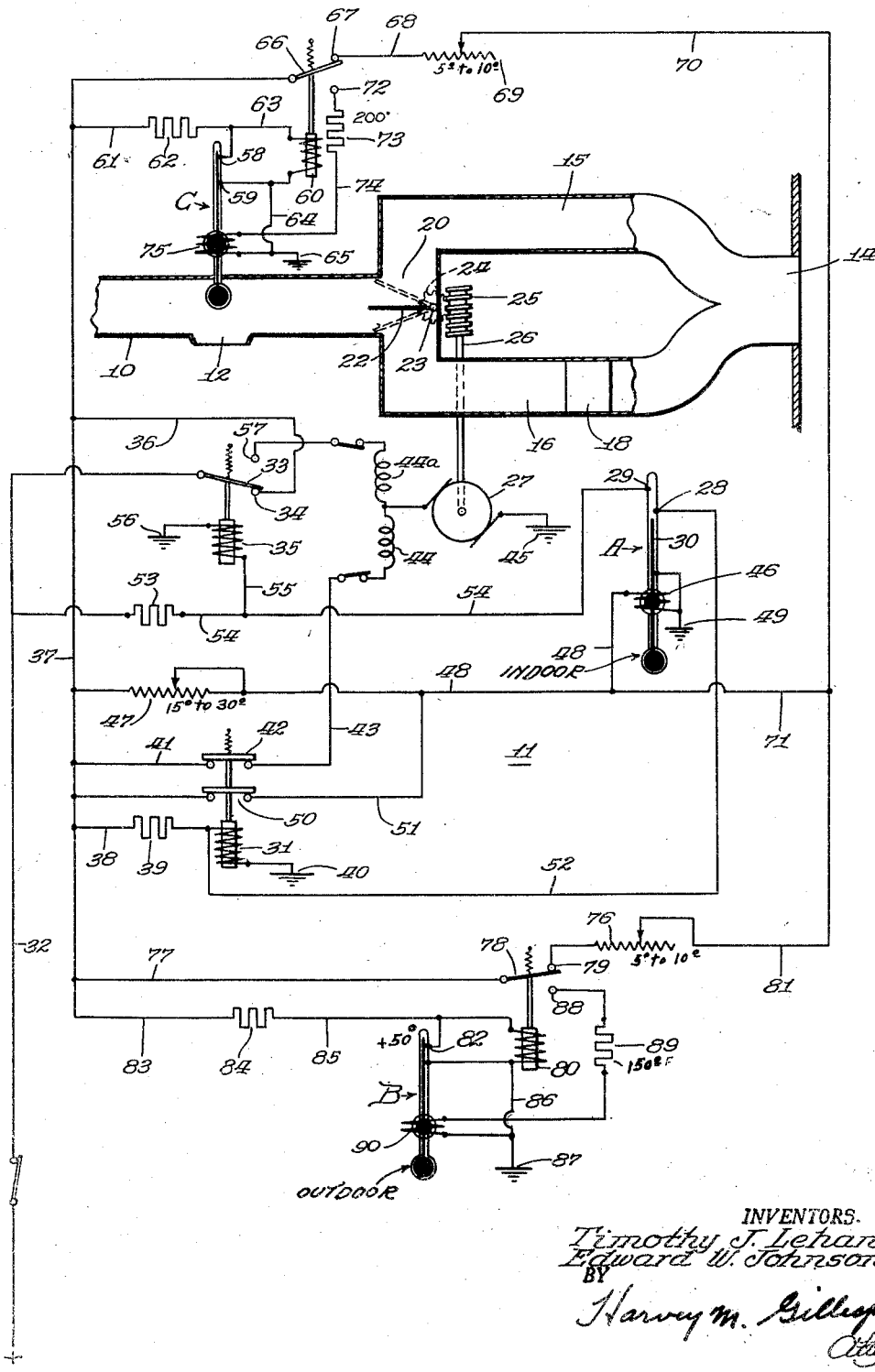
INVENTORS.
Timothy J. Lehane
Edward W. Johnson
BY
Harvey M. Gillespie Patented Aug. 19, 1952

2,607,532

UNITED STATES PATENT OFFICE 2,607,532

TEMPERATURE CONTROL FOR AIR BLENDING HEATING SYSTEMS

Timothy J. Lehane, North Riverside, and Edward W. Johnson, Chicago, Ill., assignors to Vapor Heating Corporation, Chicago, Ill., a corporation of Delaware Application June 17, 1948, Serial No. 33,624

11 Claims. (Cl. 236—68)

This invention relates to improvements in temperature control systems of the general class in which air streams of different temperatures are blended in predetermined proportions and introduced into an enclosed space to maintain the space at a desired temperature.

A principal object of the invention is to provide improved means for so controlling the air blending operations that the air delivered into the space is normally maintained at a predetermined temperature. In this connection the invention includes control means responsive to the temperature within the space being controlled and to the temperature of the delivered air, which controls cooperate with each other and are effective, when the temperature of the delivered air falls below a predetermined point, to adjust the functional setting of the space thermostat so as to anticipate and automatically counteract the reduced heating effect on the space which would otherwise result from a prolonged reduction in the temperature of the delivered air.

Another object of the invention includes the provision of means responsive to the outside temperature and adapted to momentarily adjust the functional setting of the space thermostat when the outside temperature falls below a predetermined point. In this connection the invention includes an outside thermostat and an auxiliary electrical heater therefor having a relatively high value; the heater being effective, for all practical temperatures, to produce cycling operations of the outside thermostat and consequent momentary adjustments of the space thermostat as long as the outside temperature remains below the functional setting of the outside thermostat.

A further object is to provide electrical control connections for the various control elements so that all auxiliary heat is removed from all thermostats of the system and thereby effect rapid cooling of the thermostats when the temperature at the space thermostat is sufficient to close a circuit through its upper contact.

One approved form of the invention is illustrated diagrammatically in the accompanying drawing.

Referring to the drawing, air is directed, by means of a distributing duct 10, usually to several openings 12, suitably placed throughout the enclosed space, designated generally by the reference numeral 11, whose temperature is being controlled. The air is supplied under pressure to the duct through an intake port 14. The particular manner in which the air pressure is created is not important, insofar as the broad aspect of the invention is concerned. Obviously, it may be forced into the port 14 by means of a blower of known construction (not shown) or it may be forced into said port, as herein contemplated, by movement of the structure as a whole through the atmosphere at a suitable speed.

Near the intake port 14, the duct is divided to form parallel conduits 15 and 16, respectively, in the latter of which is seated a heat exchanger 18 of any suitable or approved construction adapted to heat the air passing therethrough.

The conduit 15 by-passes the heat exchanger and delivers unheated air to the junction 20 where it meets the stream of heated air from conduit 16. The proportions of heated and unheated air which enter the distributing duct 10 is determined by the position of a valve 22. The said valve is swingably mounted on a shaft 23 and is capable of assuming any position between the two positions indicated in dotted outline. When it is in mid-position, according to the full-line showing, the volumes of heated and unheated air entering duct 10 are approximately equal; but when the valve is swung to one or the other of its two limiting positions, either the heated air or the unheated air is completely cut off, as will be self-evident, obviously, the temperature of the stream of blended air flowing through distributing duct 10 depends in part, upon the temperature of the heating unit 18, the temperature of the incoming air and upon the position of valve 22. In order to maintain a uniform predetermined temperature in the enclosed space being heated, it is necessary to adjust the position of valve 22 from time to time in order to vary the proportions of heated and unheated air admitted to the distributing duct 10.

A worm wheel 24 is keyed to shaft 23 and meshed with a worm 25 which, in turn is secured to a shaft 26; and the latter is suitably connected to a reversible electric motor 27, the function of which is to rotate valve 22 in one direction or the other in response to the automatic controls hereinafter described.

The automatic control system comprises three thermostats A, B and C, preferably of the mercury column type, which are so located that they respond respectively and individually, (1) to the temperature of the enclosed space 11; (2) to the outside temperature; (3) to the temperature of the stream of air in distributing duct 10.

The three thermostats are so combined and co-ordinated that they are jointly effective to keep the temperature of space 11 within a narrow range of temperature variation, notwithstanding the occurrence of changes in outside temperature and also notwithstanding changes in the temperature of the delivered air. The heating of the incoming air is increased or decreased, as required, in advance of any noticeable change of inside temperature, so that the tendency of any change to occur in the temperature of the space 11 is counteracted and avoided.

The energization of the valve operating motor 27 is brought about by the functioning of the space control thermostat A. This thermostat is provided with spaced contacts 28 and 29 which define the lower and upper limits, respectively, of a predetermined temperature range. In the prsnt illustration the temperature range is equivalent to 5° Fahrenheit, since the lower contact 28 represents a space temperature of 80° Fahrenheit and the upper contact 29 represents a space temperature of 85° Fahrenheit. The temperature values of the lower and upper contacts 28 and 29 may be varied, as will be hereinafter described, by applying variable amounts of heat to the thermostat.

Heating cycle

For the purpose of understanding the operation of the valve actuating motor 27, in response to the control functions of thermostat A, it will be sufficient to point out that, when the temperature of the space 11 is within the temperature range (80° to 85°) defined by contacts 28 and 29, the mercury column 30 will stand at some location between said contacts 28 and 29. If the temperature within said space 11 is below the lower limit of the control temperature range, the mercury column 30 stands below contact 28 and, therefore, opens a control circuit which results in energizing a relay 31 for closing an energizing circuit through motor 27 to rotate said motor in a direction to move the valve 22 in a direction to increase the proportion of heated air delivered into the distributing duct 10. The electrical circuit for energizing the relay 31 leads from the positive line 32 through contacts 33 and 34 of a normally energized relay 35, conductor 36, secondary bus conductor 37, branch conductor 38 and resistor 39 through the solenoid of relay 31 to the ground 40. The said operating circuit of the motor 27 leads from the secondary bus conductor 37 through conductor 41, upper contact 42 of relay 31, conductor 43 and one motor field 44 and armature 27 to the ground 45. This motor operating circuit will be closed only momentarily, since the said relay 31, simultaneously with the closing of said motor circuit, also closes a circuit for adding a large amount of heat to an auxiliary heater 46 of thermostat A. The said auxiliary heater 46 is normally supplied, during the heating cycle of the system, with a predetermined amount of electric current for the purpose of setting the control point of the thermostat to correspond with the desired upper and lower limits of the said temperature range. This circuit leads from the secondary bus conductor 37 through variable resistor 47 and conductor 48 through the heating coil 46 and thence to the ground 49. However, the heating circuit which is closed through relay 31 directs a large amount of additional heating current from said bus conductor 37 through relay contact 50 and conductors 51 and 48 to the heater 46 so as to close the lower contact 28 of the thermostat A as quickly as possible and thereby limit the movement of the valve 22 to a small increment of its total range. The closing of the thermostat A at its lower contact closes a circuit through conductor 52 which shunts out the relay solenoid 31 and thereby permits the relay contacts 42 and 50 to open and consequently stop all operation of the motor 27 and valve 22. If the said adjustment of the valve 22 is sufficient to maintain the space 11 at a temperature within a temperature range of 80° to 85°, the relay 31 remains de-energized and the motor 27 and the valve 22 will remain stationary. If the mercury column 30 of thermostat A again recedes below the contact 28, the motor will be again energized to impart another movement in the same direction, to the valve 22.

The above heating cycle of the heating system will continue until the temperature of enclosed space is sufficient to maintain the mercury column 30 in a position between the lower and upper contacts 28 and 29 of thermostat A.

Cooling cycle

When the mercury column of thermostat A engages the upper contact 29, the normally energized circuit for relay 35 is by-passed around the relay solenoid and the relay is thereby de-energized. The energized circuit for said relay 35 leads from the positive line 32 through resistor 53 and conductors 54 and 55 to the relay solenoid and thence to the ground 56. The said by-passing circuit leads from the positive line 32 through resistor 53 and conductor 54 to the upper contact 29 of thermostat A and thence direct through the mercury column 30 to the ground 49.

The said de-energization of relay 35 opens the normally closed relay contacts 33 and 34 and closes a circuit through the relay contacts 33 and 57 to close a motor energizing circuit for imparting movement to the motor 27 and valve 22 in a direction to reduce the volume of heated air and increase the volume of unheated air entering the distributing duct 21. This circuit leads from positive line 32 through the relay contacts 33 and 57 through the other field winding 44a of the motor and thence through the armature 27 to the ground 45. The extent of movement for each cooling adjustment of the valve 22 will depend upon the cooling effect on the thermostat A and consequently the time required for its mercury column to move away from the contact 29. The required cooling of the thermostat A is obobtained quite promptly, since the opening of contacts 33 and 34 of relay 35 devitalizes the secondary bus conductor 37 and thereby de-energizes the auxiliary heater. The variable resistor 47, when in the adjusted position herein shown, has a value of approximately 15° Fahrenheit. When this amount of heat is removed from the auxiliary heater 46 the mercury column 30 will recede from the upper contact 29 quickly. However, as soon as the said circuit is broken the heating circuit through resistor 47 is re-established. The thermostat A, therefore, will cycle off its upper contact until the cooling function becomes sufficiently effective within the enclosure 11 to alter the ambient temperature of thermostat A.

Outside and duct temperature thermostats

In order to increase the sensitivity of thermostat A, during the cooling cycle, and to also provide means for anti-dipating and automatically counteracting variation in the space temperature which may be due either to fluctuations of the outside temperature above and below a given point or to fluctuations of the temperature of the delivered air above and below a given control point, additional auxiliary heat, aggregating 10°, more or less, is applied to and removed from the space thermostat A. The heating circuits for this additional auxiliary heat leads from the secondary bus conductor 37. Consequently, all heat from these circuits, as well as from the first mentioned heating circuit, is removed from the thermostat A when its mercury column engages the upper contact 29.

It is desired to maintain the air delivered from the distributing duct 10 at a prescribed temperature, for example 200° Fahrenheit, and to make compensating adjustments of the space thermostat A, anytime the temperature of the delivered air falls below the prescribed temperature. The adjustment, according to the present disclosure, is 5° Fahrenheit, consequently the mercury column 30 of the thermostat A, if it is then standing above the lower contact 28, will drop below said lower contacts. This condition results in again energizing the motor 27 to adjust valve 22 in a direction to increase the proportion of heated air delivered into the distributing duct 10.

The duct thermostat, as previously indicated, is designated by the letter C. Its contacts 58 and 59 are connected in a circuit for energizing a solenoid switch 60. This circuit leads from secondary bus 37 and comprises conductor 61, resistor 62, conductor 63 through the solenoid winding and conductor 64 to the ground 65; but the said winding is short circuited through the mercury column of thermostat C so long as the temperature of the air in delivery duct 10 stands at or above the required temperature of 200° Fahrenheit. The result of this condition is that the relay contact 66 engages contact 67, thereby completing a circuit through conductor 68, variable resistor 69, conductors 70, 71 and 48 to the heating coil 46 of thermostat A. The current supplied to heating coil 46 through the variable resistor 69 is sufficient to raise the mercury column 30 a distance equivalent to several degrees of temperature—depending upon the adjustment of the resistor 69. This adjustment, as shown in the drawing, represents approximately 5° Fahrenheit.

Whenever the temperature of the air stream in delivery duct 10 decreases sufficiently to break the circuit at contact 58, this removes the short circuit from the winding of the solenoid of relay 60, causing it to become energized, whereupon the contact 66 is moved out of engagement with contact 67 and into engagement with an alternate contact 72. As a consequence, the current previously supplied to heating coil 46 through the variable resistor 69 is cut off; and this is equivalent to suddenly decreasing, by several degrees, the ambient temperature affecting thermostat A. Assuming, under this condition, that the mercury column 30 of thermostat A stands between contacts 28 and 29, the removal of the heating current supplied through resistor 69 (ordinarily equivalent to 5° of heat) will cause the mercury column of thermostat A to drop sufficiently to break contact at 28, thereby removing the ground 49 from conductors 52 and consequently energizing the relay 31, whereupon a motor circuit is established through the field coil 44 to impart an opening movement to valve 22 in a direction to increase the proportion of heated air delivered into the distributing duct 10. The previously mentioned energization of relay 60 closes a circuit from secondary bus conductor 37 through relay contacts 66 and 72, through cycle resistor 73, conductor 74 and heating coil 75 of duct thermostat C and thence to the ground 65; and this quickly raises the temperature of the thermostat C. The said cycle resistor 73, as herein shown, has a value of approximately 200° Fahrenheit. Consequently this amount of heat added to the thermostat C quickly raises the mercury column thereof into engagement with the upper contact 58, thereby shorting out the winding of relay solenoid 60 so as to permit the relay contact 66 to re-engage the contact 67 and thereby re-apply the additional heating current to the heater 46 of thermostat A so as to check the downward movement of this mercury column 30 of the space thermostat A. If the last described adjustment of valve 22 is insufficient to hold the mercury column of duct thermostat C engaged with its contact 58, the relay 60 will be re-energized to again remove the 5° of heat from the thermostat A and thereby cause a further adjustment of the valve 22 in a direction to increase the temperature within duct 10.

The system thus far described, exclusive of thermostat B and its immediate associated circuit elements, including variable resistor 76, is sufficient, with a relatively uniform outside temperature, to maintain the delivered air at or above the minimum temperature desired and to maintain the enclosed space in the selected temperature range. However, when the outside temperature fluctuates above and below a given outside temperature, it is desirable to normally adjust the space thermostat A to compensate for these changes. Consequently, so long as the outside temperature is at or above a given temperature, for example 50° Fahrenheit, and the mercury column of thermostat A stands below its upper contact 29, a quantity of heat, for example 5° Fahrenheit, is added to the thermostat A through the variable resistor 76. This heating circuit leads from the secondary bus conductor 37 through conductor 77, contacts 78 and 79 of solenoid switch 80, thence through variable resistor 76 and conductors 81, 71 and 48 to the heater 46 of thermostat A and thence to the ground 49. When that condition obtains, the winding of solenoid switch 80 is short circuited and, therefore, not energized. The contact 78 engages contact 79 and current is being passed through variable resistor 76. This added heat biases the mercury column of thermostat A upwardly several degrees; and it may be assumed for the moment that the top of the mercury column stands at a point between the contacts 28 and 29—corresponding to the temperature range prescribed for the enclosed space 11. Now let it be further assumed that the outside temperature for any reason may drop below the temperature setting of contact 82 of the outside thermostat B. This at once establishes an effective energizing circuit through the solenoid of relays 80 from the secondary bus 37 through conductor 83, resistor 84, conductor 85, solenoid winding and conductor 86 to the ground 87. The relay contact 78 thereupon moves out of engagement with the contact 79 and into engagement with its alternate contact 88, thus closing a circuit through a cycle resistor 89 and heating coil 90 of thermostat B and thence to the ground 87. This movement of contact 78 of relay 80 also breaks the circuit through the variable resistor 76 to heating coil 46. This will cause an immediate contraction of the mercury column 30 of thermostat A and, with the 5° adjustment shown, will result in its dropping to a point below contact 28, the ground 49 thereby being removed from conductor 52 and the solenoid winding of relay 31 is again energized through the circuit leading from bus conductor 37, through conductor 38, resistor 39, solenoid coil 31, to ground 40. This re-energization of relay 31 closes the circuit through contacts 42 and field winding 44 of the motor 27 whereupon the valve 22 is rotated clockwise so as to admit an increased proportion of heated air to the distributing duct 10 and thence into the space 11. All this occurs so quickly that the addition of heat is brought into the enclosed space 11 before the outside temperature decrease can have any noticeable effect on the temperature within said space 11.

If the outside temperature drop is not a severe one the auxiliary heat applied to the thermostat B will cause the mercury column thereof immediately to rise and re-engage contact 82, thereby shunting out the winding of the solenoid of relay 80. This restores the circuit through variable resistor 76 and heating coil 46 and causes the mercury column 30 of thermostat A to rise; and at the same time the shunting out of the variable resistor 47 by the closing of relay contact 50 results in a still further increase of a heating current through auxiliary heater 46. Thus it will be seen that the motor 27 remains energized only momentarily.

When the solenoid of relay 80 is de-energized as a result of the mercury column of thermostat B re-engaging its contact 82, the energizing circuit through heat coil 46 is opened, and unless the outside temperature has, in the meantime risen, the mercury column will again drop, thereby causing relay 80 to be again energized. This causes another drop of the mercury column of thermostat A, which may, in turn, cause another energization of relay 31 and a further consequent operation of motor 27 to move valve 22 still further in the clockwise direction.

If the decrease of outside temperature moves to a substantial distance below the temperature setting of thermostat B (plus 50° Fahrenheit), more time will be required for heating coil 90 to cause the mercury column of thermostat B to again engage the contact 82, and in such case there will be a corresponding delay in the upper movement of the mercury column 30 of thermostat A. This, of course, means that the valve 22 will be moved farther in the clockwise direction per each energization of motor 27, thus increasing the heat intake to an extent proportional to the outside temperature drop.

From the above description it will be seen that the thermostats A, B and C, together with their associated relays, are so cooperatively connected that the thermostat A, when its mercury column 30 engages its upper contact 85, will respond quickly to the cooling function of the system so that the valve 22 will be modulated to a desired position to maintain the temperature within the space 11 within the temperature range defined by the lower and upper contacts of thermostat A. It will also be observed that the maintenance of the temperature within the enclosed space is altered, from time to time, in anticipation of changes which might otherwise result from variations in the temperature of the delivered air and from variations of the outside temperature.

We claim:

1. In a temperature control system, the combination with means for delivering heat into an enclosed space including a valve and electrical mechanism for operating the valve to increase and decrease the delivery of heat, of means for controlling the operations of said valve comprising a thermostat responsive to the temperature in said space and provided with spaced contacts defining the upper and lower limits of a predetermined temperature range, an upper limit control circuit connected through said upper contact and electrical relay means controlled thereby and effective, when the control circuit is closed, to close an energizing circuit through said valve operating mechanism to move the valve in a direction to decrease the delivery of heat, a control circuit connected through the lower contact of said thermostat and electrical relay means controlled thereby and effective, when the last mentioned control circuit is opened, to close an energizing circuit through said valve operating mechanism to move the valve in a direction to increase the delivery of heat to said space, an electrical heater for said thermostat, an energizing circuit for said heater comprising three paths connected through the first mentioned electrical relay means when its control circuit is open; the first path including a variable resistor for adjusting the amount of heat applied to the thermostat heater, the second path being connected through the second mentioned electrical relay means and is effective, when the second relay means is energized, to add a large amount of heating current to the thermostat heater, and the third path being connected through the first mentioned electrical relay means and includes a second variable resistor for metering an additional amount of heating current to said thermostat, a third electrical relay means for opening and closing the said third path, and a thermostat responsive to the outside temperature for controlling the operation of said third electrical relay means.

2. In a temperature control system, the combination with means for delivering heat into an enclosed space including a valve and electrical mechanism for operating the valve to increase and decrease the delivery of heat, of means for controlling the operations of said valve comprising a thermostat responsive to the temperature in said space and provided with spaced contacts defining the upper and lower limits of a predetermined temperature range, an upper limit control circuit connected through said upper contact and electrical relay means controlled thereby and effective, when the control circuit is closed, to close an energizing circuit through said valve operating mechanism to move the valve in a direction to decrease the delivery of heat, a control circuit connected through the lower contact of said thermostat and electrical relay means controlled thereby and effective, when the last mentioned control circuit is opened, to close an energizing circuit through said valve operating mechanism to move the valve in a direction to increase the delivery of heat to said space, an electrical heater for said thermostat, an energizing circuit for said heater comprising three paths connected through the first mentioned electrical relay means when its control circuit is open; the first path including a variable resistor for adjusting the amount of heat applied to the thermostat heater, the second path being connected through the second mentioned electrical relay means and is effective, when the second relay means is energized, to add a large amount of heating current to the thermostat heater, and the third path being connected through the first mentioned electrical relay means and includes a second variable resistor for metering an additional amount of heating current to said thermostat, a third electrical relay means for opening and closing the said third path, a thermostat responsive to the outside temperature for controlling the operation of said third electrical relay means, an electrical heater for said second thermostat and an energizing circuit therefor connected through the first and third electrical relay means and effective to add heat to the outside thermostat when said third path is opened through the heater for the first mentioned thermostat.

3. In a temperature control system, the combination with means for delivering heat into an enclosed space including a valve and electrical mechanism for operating the valve to increase and decrease the delivery of heat, of means for controlling the operations of said valve comprising a thermostat responsive to the temperature in said space and provided with spaced contacts defining the upper and lower limits of a predetermined temperature range, an upper limit control circuit connected through said upper contact and electrical relay means controlled thereby and effective, when the control circuit is closed, to close an energizing circuit through said valve operating mechanism to move the valve in a direction to decrease the delivery of heat, a control circuit connected through the lower contact of said thermostat and electrical relay means controlled thereby and effective, when the last mentioned control circuit is opened, to close an energizing circuit through said valve operating mechanism to move the valve in a direction to increase the delivery of heat to said space, an electrical heater for said thermostat, an energizing circuit for said heater comprising three paths connected through the first mentioned electrical relay means when its control circuit is open; the first path including a variable resistor for adjusting the amount of heat applied to the thermostat heater, the second path being connected through the second mentioned electrical relay means and is effective, when the second relay means is energized, to add a large amount of heating current to the thermostat heater, and the third path including a second variable resistor for metering an additional amount of heating current to said thermostat, a third electrical relay means for opening and closing the said third path when the first relay means is energized, a second thermostat responsive to the temperature of the heat delivered into the enclosed space for controlling the operation of said third electrical relay means, an auxiliary heater for the second thermostat, and an energizing circuit for the last mentioned heater connected through the third relay means and effective, when the latter is energized to energize said last mentioned heater.

4. In a temperature control system, the combination with means for delivering heated air into an enclosed space including a duct, a valve therein and electrical mechanism for operating the valve to increase and decrease the delivery of said heated air, of means for controlling the operations of said valve comprising a thermostat responsive to the temperature in said space and provided with spaced contacts defining the upper and lower limits of a predetermined temperature range, an upper limit control circuit connected through said upper contact and electrical relay means controlled thereby and effective, when the control circuit is closed, to close an energizing circuit through said valve operating mechanism to move the valve in a direction to decrease the delivery of heated air, a control circuit connected through the lower contact of said thermostat and electrical relay means controlled thereby and effective, when the last mentioned control circuit is opened, to close an energizing circuit through said valve operating mechanism to move the valve in a direction to increase the delivery of heated air into said space, an electrical heater for said thermostat, an energizing circuit for said heater comprising three paths connected through the first mentioned electrical relay means; the first path including a variable resistor for adjusting the amount of heat applied to the thermostat heater, the second path being connected through the second mentioned electrical relay means and is effective, when the second relay means is energized, to add a large amount of heating current to the thermostat heater, and the third path includes a second variable resistor for metering an additional amount of heating current to said thermostat, a third electrical relay means for opening and closing the said third path, a duct thermostat responsive to the temperature of the air delivered into the enclosed space for controlling the operation of said third electrical relay means, an electrical heater for the second mentioned thermostat and an energizing circuit therefor connected through the first and third electrical relay means and effective to add heat to the second thermostat when said third electrical relay means is energized.

5. In a temperature control system, the combination with means for delivering heat into an enclosed space including a valve and electrical mechanism for operating the valve to increase and decrease the delivery of heat, of means for controlling the operations of said valve comprising a thermostat responsive to the temperature in said space and provided with spaced contacts defining the upper and lower limits of a predetermined temperature range, an upper limit control circuit connected through said upper contact and electrical relay means controlled thereby and effective, when the control circuit is closed, to close an energizing circuit through said valve operating mechanism to move the valve in a direction to decrease the delivery of heat, a control circuit connected through the lower contact of said thermostat and electrical relay means controlled thereby and effective, when the last mentioned control circuit is opened, to close an energizing circuit through said valve operating mechanism to move the valve in a direction to increase the delivery of heat to said space, an electrical heater for said thermostat, and an energizing circuit for said heater comprising four paths connected through the first mentioned electrical relay means when its control circuit is opened, whereby all said paths are opened when the control circuit for said first mentioned electrical relay means is closed through the upper contact of said thermostat; the first path of said heating circuit being provided with a variable resistor, the second path being connected also through the second mentioned relay means, a third electrical relay means having a deenergized closed contact interposed in the said third path, a fourth electrical relay means having a de-energized closed contact interposed in the said fourth path, and a thermostat responsive to the outside ambient temperature for controlling the energization of the third electrical relay means.

6. In a temperature control system, the combination with means for delivering heated air into an enclosed space including a duct, a valve therein and electrical mechanism for operating the valve to increase and decrease the delivery of said heated air, of means for controlling the operations of said valve comprising a thermostat responsive to the temperature in said space and provided with spaced contacts defining the upper and lower limits of a predetermined temperature range, an upper limit control circuit connected through said upper contact and electrical relay means controlled thereby and effective, when the control circuit is closed, to close an energizing circuit through said valve operating mechanism to move the valve in a direction to decrease the delivery of heated air, a control circuit connected through the lower contact of said thermostat and electrical relay means controlled thereby and effective, when the last mentioned control circuit is opened, to close an energizing circuit through said valve operating mechanism to move the valve in a direction to increase the delivery of heated air into said space, an electrical heater for said thermostat, and an energizing circuit for said heater comprising four paths connected through the first mentioned electrical relay means when the latter is energized, the first path of said heating circuit being provided with a variable resistor, the second path being connected also through the second mentioned relay means, a third electrical relay means having a de-energized closed contact interposed in the said third path, a fourth electrical relay means having a de-energized closed contact interposed in the said fourth path, a thermostat responsive to the outside ambient temperature for controlling the energization of the third electrical relay means, and a thermostat responsive to the duct temperature of the air delivered into said space for controlling the energization of the fourth electrical relay means.

7. In a temperature control system, the combination with means for delivering heated air into an enclosed space including a duct, a valve therein and electrical mechanism for operating the valve to increase and decrease the delivery of heated air, of means for controlling the operations of said valve comprising a thermostat responsive to the temperature in said space and provided with spaced contacts defining the upper and lower limits of a predetermined temperature range, an upper limit control circuit connected through said upper contact and electrical relay means controlled thereby and effective, when the control circuit is closed, to close an energizing circuit through said valve operating mechanism to move the valve in a direction to decrease the delivery of heated air, a control circuit connected through the lower contact of said thermostat and electrical relay means controlled thereby and effective, when the last mentioned control circuit is opened, to close an energizing circuit through said valve operating mechanism to move the valve in a direction to increase the delivery of heated air into said space, an electrical heater for said thermostat, and an energizing circuit for said heater comprising four paths connected through the first mentioned electrical relay means when its control circuit is opened, whereby all four paths are opened when the control circuit for said first mentioned electrical relay means is closed through the upper contact of said thermostat; the first path of said heating circuit being provided with a variable resistor, the second path being connected also through the second mentioned relay means, a third electrical relay means having a de-energized closed contact interposed in the third path, a fourth electrical relay means having a de-energized closed contact interposed in the said fourth path, a thermostat responsive to the outside ambient temperature for controlling the energization of the third electrical relay means, a thermostat responsive to the duct temperature of the air delivered into said space for controlling the energization of the fourth electrical relay means, and electrical heaters for the outside thermostat and for the thermostat responsive to the duct temperature of the air delivered into the space and energizing circuits therefor closed respectively through the third and fourth electrical relay means and also through said first electrical relay means.

8. A heating and temperature-control system comprising, in combination, an air duct for delivering heated air into an enclosed space, means for maintaining said delivered air at a predetermined temperature including a valve and electrical operating means therefor, two alternative energizing circuits for energizing said valve operating means, one of said circuits being effective to operate the valve operating means to move the valve in a direction to decrease the temperature of the air in said duct and the other of said circuits being effective to energize said valve operating means to move the valve in a direction to increase the temperature of the air in said duct, a first thermostat responsive to the ambient temperature within said space and effective to cause closure of said motor energizing circuits alternatively in accordance with heating requirements, an electric heater for thermally biasing said first thermostat, an energizing circuit for said electric heater, an electromagnetic switch having a de-energized closed contact position for closing the last-mentioned circuit, and a second thermostat responsive to outside temperature and effective to energize said switch to open said heater energizing circuit when the outside temperature drops below a certain value.

9. A heating and temperature-control system according to claim 8, including an electric heater for biasing said second thermostat, and an energizing circuit for the last-mentioned heater, said switch being operative to close said last-mentioned energizing circuit when it opens the energizing circuit of said first-mentioned heater.

10. A heating and temperature-control system according to claim 8, including a second energizing circuit for the heater associated with said first thermostat, a second electromagnetic switch for opening and closing said second energizing circuit, and a third thermostat for controlling said second switch, said third thermostat having a temperature-responsive portion located in said duct, said third thermostat being effective to cause said second switch to open said second energizing circuit when the temperature of the air flowing through said duct is below a certain predetermined value.

11. A heating and temperature-control system according to claim 10, comprising a third energizing circuit for the heater associated with said first thermostat, said third energizing circuit including a series resistor, and an electromagnetic switch under control of said first thermostat and operative to shunt out said resistor when the temperature affecting said first thermostat drops below a certain low value.

TIMOTHY J. LEHANE.
EDWARD W. JOHNSON.

REFERENCES CITED

The following references are of record in the file of this patent:

UNITED STATES PATENTS

| Number | Name | Date |
| --- | --- | --- |
| 2,138,505 | Parks | Nov. 29, 1938 |
| 2,171,803 | Parks et al. | Sept. 5, 1939 |
| 2,249,223 | Olson | July 15, 1941 |
| 2,284,764 | Parks | June 2, 1942 |
| 2,328,472 | Lehane et al. | Aug. 31, 1943 |
| 2,382,073 | Lehane et al. | Aug. 14, 1945 |

FOREIGN PATENTS

| Number | Country | Date |
| --- | --- | --- |
| 526,986 | Great Britain | Sept. 30, 1940 |